C. LE G. FORTESCUE.
SYSTEM OF DISTRIBUTION.
APPLICATION FILED MAR. 9, 1917. RENEWED MAY 13, 1918.
1,284,292.
Patented Nov. 12, 1918.
2 SHEETS—SHEET 1.
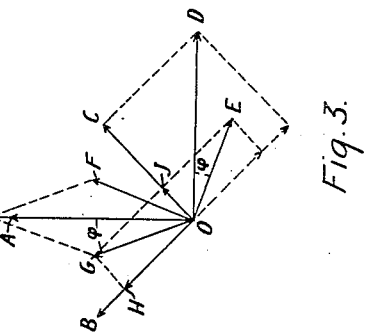
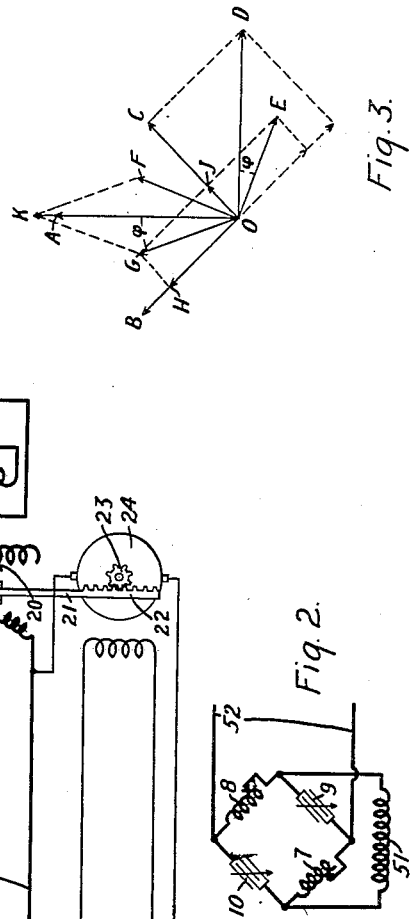
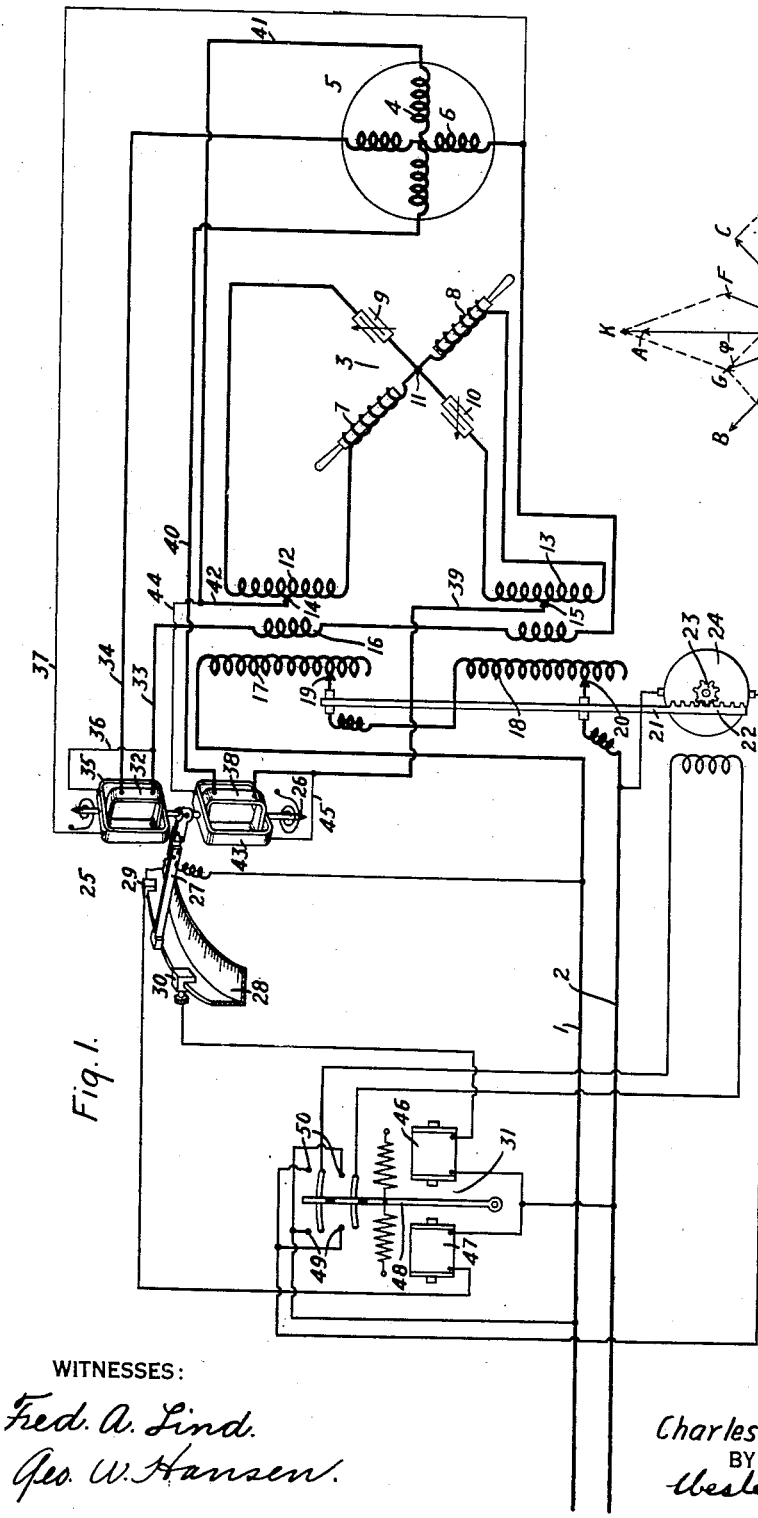
WITNESSES:
Fred. A. Lind.
Geo. W. Hansen.
INVENTOR
Charles LeG. Fortescue
BY
Wesley G. Carr
ATTORNEY

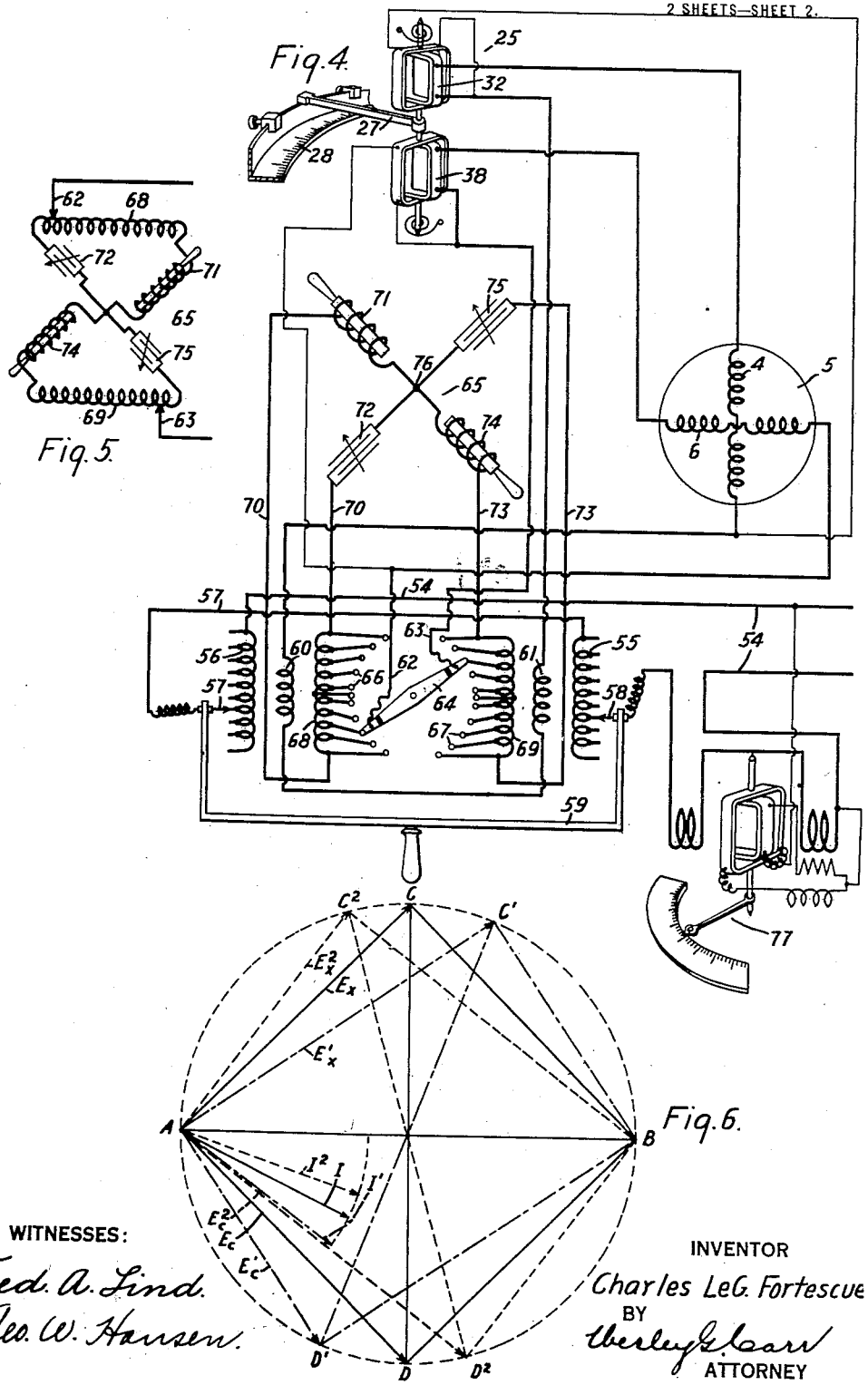

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF DISTRIBUTION.

1,284,292.  Specification of Letters Patent.  Patented Nov. 12, 1918.

Application filed March 9, 1917, Serial No. 153,606. Renewed May 13, 1918. Serial No. 234,343.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Systems of Distribution, of which the following is a specification.

My invention relates to alternating-current distributing systems and it has special relation to phase-modifying means whereby polyphase apparatus, such as motors, generators, rotary converters and the like, may be operated from single-phase power-supply circuits.

More particularly, my invention relates to phase-splitting devices and control systems therefor, whereby the electrical conditions obtaining in both the single-phase power-supply circuits and the polyphase load circuits associated with the phase-splitting devices may be controlled and regulated.

By means of my present invention, balanced polyphase relations may be maintained in the polyphase load circuits, irrespective of the load conditions obtaining therein and, at the same time, the power-factor of the single-phase supply circuit may be maintained at a substantially constant value. In consequence thereof, polyphase apparatus, such as I have indicated above, may be economically and efficiently operated from a single-phase power circuit with results comparable to those obtained when the polyphase apparatus is operated on polyphase circuits of the usual character.

For a better understanding of the characteristic features of my invention, reference may be had to the following description and the accompanying drawing in which Figure 1 is a diagrammatic view of an electrical distributing system embodying a form of my invention; Fig. 2 is a similar view showing an electrical equivalent of the phase-splitting device embodied in the system of Fig. 1; Fig. 3 is a vector diagram showing the relationships between voltage and current vectors by means of which the electrical conditions obtaining in my distributing system may be represented; Fig. 4 is a diagrammatic view of a modified form of the system of Fig. 1; Fig. 5 is a simplified diagram for illustrating the operation of the phase-splitting device embodied in the system of Fig. 4, and Fig. 6 is a vector diagram showing the relations between the electromotive forces obtaining in the phase-splitting device of Fig. 4, under different load conditions.

Referring to Fig. 1, a single-phase power-supply circuit, comprising mains 1 and 2, furnishes power to a phase-modifying device 3 which, in turn, supplies alternating currents to one phase 4 of a polyphase apparatus 5. The apparatus 5 is represented as an induction motor having, in addition to the phase winding 4, a second phase winding 6. The phase winding 6, as will be hereinafter explained, is furnished with power directly from the single-phase supply circuit, while the phase winding 4 is supplied with power through the phase-splitting device 3.

The phase-splitting device 3 comprises adjustable inductive reactance elements 7 and 8 and adjustable condensive reactance elements 9 and 10, all of said elements being connected to a common point 11. The elements 7 and 9 are paired and have their free terminals connected to a secondary transformer winding 12, while the elements 8 and 12 are likewise paired and have their free terminals connected to a second transformer winding 13. Taps 14 and 15, provided at intermediate points on the windings 12 and 13 respectively, provide means for connecting the phase winding 4 of the polyphase apparatus 5 to the phase-splitting device 3.

A second secondary winding 16, in this instance, comprising two coils that together have the same number of conductor turns as are embodied in either the winding 12 or the winding 13, delivers power to the other phase 6 of the polyphase apparatus 5. The secondary windings 12, 13 and 16 of the power transformer are inductively related to a primary winding comprising two coils 17 and 18 which are connected across the single-phase mains 1 and 2. The winding 17 is connected in series circuit with the winding 18, through an adjustable lead 19. An adjustable lead 20, which occupies a position on the winding 18 that corresponds, at all times, to the position of the lead 19 on the winding 17, is mounted on a member 21 with the adjustable lead 19, The member 21 is provided, at its lower end, with a rack 22 which, in turn, engages a pinion 23 mounted upon the shaft of a motor 24. As the shaft of the motor 24 rotates, it will be evident that the positions of the leads 19 and 20 are simultaneously varied in such a manner that the transformer windings 12 and 13, as well as the transformer winding 16, may be simultaneously impressed with electromotive forces of equal value.

As mentioned above, the polyphase motor 5 is to be impressed with balanced polyphase voltages at all times and this is to be accomplished by the phase-splitting device 3 and its associated control apparatus. To understand more fully the operation of the present system, assume that the motor 5 is a two-phase induction motor which is designed to operate at a substantially constant slip, under all load conditions. Hence, it follows that the power-factor of the polyphase apparatus will be maintained substantially constant under all load conditions. Again, assume that the phase modified voltage derived from the phase-splitting device 3 is equal, in value, to that impressed upon the phase-splitting device by either of the transformer windings 12 and 13. After having determined the slip at which the motor 5 is to constantly operate, the reactive elements 7, 8, 9 and 10 of the phase-splitting device 3 are so adjusted that, at a given load, balanced polyphase conditions will obtain in the two-phase windings 4 and 6 of the motor. After the electrical constants of the elements of the phase-splitting device are once adjusted for a given load on the motor 5, as mentioned above, no further adjusting is necessary, since the motor 5 operates at a constant slip or a constant power-factor at all loads.

As the loads upon the motor 5 vary, the voltages impressed upon the two-phase windings thereof must vary accordingly so that a constant power-factor may obtain in the poly-phase circuits comprising the windings 4 and 6. To this end, the voltage impressed upon the phase-splitting device is automatically varied, as well as the voltage impressed upon the secondary winding 16. This is accomplished by automatically varying the adjustable leads 19 and 20 on the primary coil-windings 17 and 18 of the power transformer.

The automatic voltage control is effected by means of a differential wattmeter relay 25 comprising two superposed wattmeter elements that are mounted upon a common shaft 26 and severally connected in circuit with the two-phase windings 4 and 6 of the polyphase motor 5. The relay 25 also comprises a contact-making element 27 that registers upon a scale 28 and is adapted to engage either an adjustable contact member 29 or an adjustable contact member 30, depending upon whether the torque developed by the upper or lower wattmeter element predominates. The wattmeter 25 is associated with an automatic reversing switch 31 of a well known type of construction. This switch, in turn, controls the direction of rotation of the motor 24.

The upper wattmeter element is connected in circuit with the secondary transformer winding 16 and the phase winding 6 of the polyphase device 5. A current coil 32 is connected in series with the secondary transformer winding 16 through a conductor 33 and in series with the phase winding 6 of the motor 5 through a conductor 34. A voltage coil 35 of the upper wattmeter element is connected across the phase winding 6 by means of conductors 36 and 37. Similarly, one terminal of a current coil 38 of the lower wattmeter element is connected in series with a conductor 39 that extends from the tap 15, in this instance, a mid-point tap provided on the secondary transformer winding 13. The other terminal of the current coil 38 is connected, by means of a conductor 40, the phase winding 4 of the motor 5, a conductor 41 and a conductor 42, to the mid-point tap 14 on the transformer secondary winding 12. A voltage coil 43 of the lower wattmeter element is connected, by means of conductors 44 and 45, across the phase winding 6.

The two wattmeter elements are so arranged that, when equal amounts of power are furnished to the two-phase windings 4 and 6, the contact-making arm 27 will register zero. In this instance, balanced polyphase conditions obtain in the circuits of the polyphase motor 5, since the elements of the phase-splitting device were previously adjusted to attain this end.

If the load upon the polyphase motor 5 is varied, the motor slip will momentarily depart from its normal value which, in turn, will destroy the balanced polyphase conditions in the motor circuits, since the power-factor of the polyphase circuits will likewise depart from its normal value. This results in establishing unbalanced polyphase conditions because the phase-splitting device 3 has been previously adjusted to maintain balanced polyphase conditions only when the power-factor in the derived phase of the polyphase circuits is maintained constant. By reason of the inequality in the amounts of power supplied to the two phases 4 and 6 of the polyphase motor, the wattmeter relay 25 will effect engagement between the contact making arm 27 and either the contact member 30 or the contact member 29.

The contact member 30 controls the excitation of an electromagnet 46 of the reversing switch 31, and the contact member 29 controls the excitation of an electromagnet 47 of the reversing switch 31. When either of the electromagnets 46 and 47 is energized, a magnetizable pivoted arm 48 is advanced in one direction or the other and closes a circuit through the motor 24, either through contact members 49 or through contact members 50 of the reversing switch 31. When the arm 48 engages the contact members 50, a circuit is established through the motor 24 to effect rotation thereof in one direction and, when the arm 48 engages the contact members 49, a circuit is established through the motor 24 to effect rotation thereof in the opposite direction.

The differential wattmeter relay 25, therefore, selectively controls the direction of rotation of the motor 24 through the reversing switch 31 which is automatically energized, as will be apparent to all those skilled in the art. As the motor 24 is energized, the adjustable taps 19 and 20 on the primary coil-windings 17 and 18 of the transformer will be varied until balanced polyphase conditions are restored in the polyphase circuits. When balanced polyphase conditions again obtain therein, the differential wattmeter relay 25 will register zero and the motor 24 will be deënergized.

The phase-splitting device of Fig. 1 may be considered, under certain conditions, as being the electrical equivalent of a "tuned-bridge", such as is shown in Fig. 2. The tuned bridge of Fig. 2 comprises the condensive elements 9 and 10 and the inductive elements 7 and 8 which are alternately connected in a closed circuit. A transformer winding 51 is connected across one diagonal of the tuned bridge and represents either of the windings 12 and 13 of Fig. 1 in that it supplies the exciting voltage to the phase-splitting device. In other words, the bridge of Fig. 2 is excited from a single-phase circuit by means of the transformer winding 51. The derived phase 52, which corresponds to the phase winding 4 of the polyphase motor 5, is connected to the other diagonal of the tuned bridge. The voltage impressed upon the derived phase 52 is equivalent to that impressed upon the mid-point taps 14 and 15 of the transformer windings 12 and 13, respectively, of the transformer of Fig. 1. If the tuned bridge of Fig. 2 should be substituted for the phase-splitting device 3 of Fig. 1, the electrical conditions obtaining in the system would not be changed. Therefore, a vector diagram representing the electrical conditions obtaining in the system of Fig. 2 will also represent the conditions obtaining in the system of Fig. 1.

To understand the polyphase conditions established by the phase-splitting device 3 in the system of Fig. 1, attention is directed to the vector diagram of Fig. 3 in which a vector OA represents the voltage impressed upon the phase winding 6. In other words, the vector OA represents, in phase and magnitude, the voltages severally impressed upon the windings 12 and 13 which are employed for exciting the phase-splitting device 3. The vector OA is also the equivalent of the vectorial sum of the vectors OC and OB, representing the voltages impressed upon the condensive element 9 and the inductive element 7, respectively, or the voltages impressed upon the condensive element 10 and the inductive element 8. This is by reason of the fact that the device 3 effects a one-to-one voltage transformation and the elements 7, 8, 9 and 10 have been so adjusted as to generate the same reactive voltages when impressed with alternating currents of the same frequency. The voltage obtaining across the taps 14 and 15 of the windings 12 and 13, respectively, or, in other words, the voltage impressed upon the phase winding 4 of the polyphase motor is represented by a vector OD which is the vectorial sum of the vector OC and a vector −OB. The vectors OA and OD are, therefore, equal to, and displaced ninety degrees from, each other.

A vector OE represents the current supplied to the phase winding 4, the power-factor of the circuit being represented by the angle Φ. Since the currents in the two windings 4 and 6 are in balanced polyphase relationship, a vector OF represents the current obtaining in the phase winding 6. Assuming negligible losses in the phase-splitting device 3, the current supplied thereto from the single-phase circuit may be represented by a vector OG that is equal to each of the vectors OE and OF and is advanced to the extent of the angle Φ with respect to the voltage vector OA.

The vector OG, of course, is the resultant of the currents supplied to the condensive element 9 and the inductive element 7. Since the vector OC represents the condensive reactance voltage, a vector OH, being a component of the vector OE and leading the vector OC by ninety degrees, represents the current supplied to the condensive element 9. Similarly, a vector OJ, being the other component of the vector OE and lagging ninety degrees behind the vector OB, represents the current supplied to the inductive element 7. The vectors OH and OJ are the two components of the vector OG. The current supplied to the phase-splitting device 3 is represented by the vector OG and the current supplied to the phase winding 6 of the polyphase motor 5 is represented by the vector OF. Therefore, the resultant current obtaining in the single-phase circuit is indicated by a vector OK which is in phase coincidence with the voltage vector OA. The voltage and the current in the single-phase circuit, being in phase with each other, result in maintaining unity power-factor in the single-phase power-supply circuit when balanced polyphase conditions obtain in the polyphase circuits.

As the loads upon the polyphase motor 5 are varied, the voltage impressed upon the phase-splitting device 3 and the phase winding 6 will be similarly varied to maintain balanced polyphase conditions in the polyphase circuits and, at the same time, unity power-factor in the single-phase circuit, since the motor 5 is designed to operate at unity power-factor or constant slip under all load conditions. The vector diagram in Fig. 3, therefore, accurately represents the electrical conditions obtaining in the system, irrespective of the value of the balanced polyphase loads in the motor 5.

In Fig. 4, a single-phase supply circuit comprising mains 54, is connected to the terminals of a primary winding of a transformer that comprises two coils 55 and 56. The coil 56 is connected in series with the coil winding 55 by means of an adjustable lead 57 that engages exposed taps on the winding 56. An adjustable lead 58, adapted to engage exposed taps on the coil winding 55, is connected to one terminal of the single-phase circuit 54. The adjustable leads 57 and 58 are mounted upon a rack 59 by means of which corresponding taps on the two coil windings 55 and 56 may be simultaneously engaged. One secondary winding of the transformer, comprising coils 60 and 61, is connected through the current coil 32 of the differential wattmeter relay 25 to the independent phase winding 4 of the polyphase apparatus 5. The derived phase winding 6 of the polyphase apparatus 5 is connected, through the current coil 38 of the differential relay 25, to leads 62 and 63 that, in turn, are connected to the contact-making members of a rotatable arm 64 of a phase-modifying device 65.

The rotatable arm 64 is adapted to engage taps 66 and 67 that extend from secondary transformer windings 68 and 69, respectively. The secondary winding 68 is connected, by means of leads 70, to the free terminals of a pair of reactive elements; namely, an inductive reactance element 71 and a condensive reactance element 72, of the phase-splitting device 65. The secondary winding 69 is connected, by means of leads 73, to the free terminals of a second pair of reactive elements; namely, an inductive element 74 and a condensive element 75 of the phase-splitting device 65. Corresponding terminals of the reactive elements 71, 72, 74 and 75 are connected to a common point 76 and are manually adjustable in order that their electrical constants may be varied as desired.

The differential wattmeter relay 25 is provided with the indicator 27 which registers upon a scale 28. The operation and construction of the relay 25 is the same as the corresponding relay of the system shown in Fig. 1.

A power-factor meter 77 is connected in the single-phase supply circuit 54 for indicating the power factor of the resultant current supplied to both the independent phase winding 4 of the polyphase device 5 and the phase-splitting device 65. The power-factor meter 77 is of a usual type of construction and, therefore, it is not deemed necessary to explain its construction or operation.

From the foregoing description, it is apparent that the voltages impressed upon the secondary windings 60, 61, 68 and 69 of the transformer may be simultaneously varied by means of moving the rack 59 whereby the number of active turns of the primary coil windings 55 and 56 may be varied in unison. The reactive elements of the phase-splitting device 65 are adjustable and, likewise, the position of the rotatable switch element 64 may be varied at will.

The diagram of Fig. 5 shows a simplified arrangement of the electrical circuits embodied in the phase-splitting device 65. The leads 62 and 63 are shown as engaging corresponding taps on the two secondary coils 68 and 69, respectively. It will be understood that, as the lead 63 is advanced toward the condensive element 75, the lead 62 is likewise advanced toward the condensive element 72 in order to occupy a corresponding position.

Referring again to Fig. 4, it may be proved mathematically that, by varying the positions of the leads 62 and 63 on the secondary transformer windings 68 and 69, respectively, the power factor obtaining in the single-phase supply circuit may be controlled. If it is desired to maintain unity power factor in the single-phase circuit, the leads 62 and 63 will engage mid-point taps on the transformer windings 68 and 69. If it is desired to maintain either a leading or a lagging power factor in the single-phase supply circuit, the leads 62 and 63 will be moved from the mid-point taps to other intermediate taps on the windings, in accordance with the value and character of the power factor that it is desired to maintain in the single-phase supply circuit.

By means of the vector diagram of Fig. 6, the distortions in the electromotive forces may be observed that are occasioned by reason of varying the power factor of the current flowing in the derived phase 6 of the polyphase apparatus. For the purpose of illustration only, it may be assumed that the kilovolt amperes required in the derived phase 6 are constant at all times but that the power factor of the current varies. Let a vector AB represent the derived voltage or that impressed upon the phase winding 6 and a vector I represent the normal lagging impressing voltages of the same value and phase upon said transformer windings, and conductors extending from intermediate taps of the said transformer windings upon which the phase-modified voltage is impressed.

3. A voltage phase-modifying device comprising two inductive and two condensive reactance elements having their electrical constants so adjusted as to generate reactive voltages of the same value when impressed with alternating currents of the same frequency, said elements being connected to a common point and the condensive elements being severally paired with the inductive elements, two transformer windings being severally connected to the free terminals of the said two pairs of elements, means for simultaneously impressing voltages of the same value and phase on the said transformer windings, and conductors extending from mid-point taps on said transformer windings upon which a derived voltage that is displaced at right angles to the voltages obtaining in said transformer windings is impressed.

4. A voltage phase-modifying device comprising two inductive and two condensive reactance elements having their electrical constants so adjusted as to establish series resonance when impressed with alternating currents of the same frequency, the elements being connected to a common point and the condensive elements being severally paired with the inductive elements, two transformer windings being severally connected to the free terminals of the said two pairs of elements, means for simultaneously impressing voltages of the same value and phase on said transformer windings, and conductors extending from mid-point taps on said transformer windings upon which a derived voltage equal to, and displaced at right angles from, the voltages obtaining in said transformer windings is impressed.

5. A voltage phase-modifying device comprising two inductive and two condensive reactance elements connected to a common point, the condensive elements being severally paired with the inductive elements, two transformer windings being severally connected to the free terminals of the said two pairs of elements, means for simultaneously impressing voltages of the same value and phase upon said transformer windings, conductors extending from intermediate taps on the said windings upon which the phase-modified voltage is impressed, and automatic means for varying the voltages impressed on said transformer windings.

6. The combination with a power-supply circuit, a load circuit, a phase-modifying means connected to said circuits to enable the phase of the voltage obtaining in the supply circuit to be modified for use in the load circuit, said phase-modifying means comprising two inductive and two condensive reactive elements connected to a common point, the condensive elements being severally paired with the inductive elements, two transformer windings being severally connected to the free terminals of said two pairs of elements and simultaneously impressed with equal voltages by the said power-supply circuit, and conductors comprising the said load circuit extending from intermediate taps on said transformer windings upon which the derived and phase-modified voltage is impressed, of means for maintaining constant power factor in the said power-supply circuit, irrespective of the load obtaining in the load circuit.

7. The combination with a single-phase power-supply circuit, an electrical apparatus having polyphase circuits, phase modifying means connected to said circuits to enable said apparatus to operate on the single-phase circuit, said phase-modifying means comprising two inductive and two condensive reactive elements connected to a common point, the condensive elements being severally paired with the inductive elements, two transformer windings being severally connected to the free terminals of the said two pairs of elements and simultaneously impressed with equal voltages by the single-phase supply circuit and conductors comprising one of said polyphase circuits extending from intermediate taps on said transformer windings, of conductors comprising another of said polyphase circuits extending from said single-phase supply circuit, and means controlled by the conditions obtaining in said polyphase circuits for automatically maintaining unity power factor in the single-phase supply circuit.

8. The combination with a single-phase power-supply circuit, an electrical apparatus having polyphase circuits, and means for directly supplying one of the polyphase circuits from the single-phase circuit, of phase-modifying means for enabling the polyphase apparatus to operate on said single-phase circuit, said phase-modifying means comprising two adjustable inductive and two adjustable condensive reactive elements connected to a common point and the condensive elements being severally paired with the inductive elements, two transformer windings being severally connected to the free terminals of the said two pairs of elements and simultaneously impressed with equal voltages by the single-phase supply circuit, taps on said transformer windings, adjustable leads adapted for connection to said taps and comprising one of said polyphase circuits, and means for connecting said adjustable leads to corresponding taps on the transformer windings whereby a predetermined power factor may be maintained current at a ninety per cent. power factor. A vector CD represents the voltage impressed upon the phase-modifying device 65 by either the transformer winding 68 or the winding 69, and the vectors $E_x$ and $E_c$ represent the voltages severally impressed upon the inductive elements and the condensive elements of the device 65, respectively. Since the device 65 is adjusted for a ninety per cent. power factor, the electromotive forces are in balanced polyphase relations and the full-line rectangle indicates the conditions obtaining in this circumstance. Assuming that the power factor in the derived phase 6 improves to ninety-five per cent. and that the valve of the current remains the same, the current is represented by a vector $I^2$ and the voltage rectangle, being distorted, may be represented by the one drawn in dotted lines. It will be apparent, from inspection, that the two-phase relationship between the impressed electromotive force $C^2D^2$ and the derived electromotive force AB is destroyed and that the voltage vector $E^2_x$ representing the voltage impressed on one of the inductive elements, is decreased, while the voltage vector $E^2_c$, representing the voltage impressed on one of the condensive elements, is increased.

When the power factor of the current decreases to eighty per cent., as indicated by a vector $I'$, the electromotive force rectangle, being distorted, may be represented by the one drawn in the dot-and-dash lines. The two-phase relationship between the electromotive forces is destroyed again, but the voltages severally impressed upon the inductive elements are considerably increased, as shown by the vector $E'_x$, while the voltages severally impressed upon the condensive elements are considerably decreased, as shown by a vector $E'_c$.

Since the kilovolt amperes in the derived phase 6 are to be maintained constant, irrespective of the power factor of the current, correct two-phase relationship between the voltages may be restored by manually adjusting the constants of the elements 71, 72, 74 and 75 of the phase-splitting device 65. In order to maintain unity power factor or any other predetermined power factor in the single-phase circuit, the rotatable switch member 64 is then manually operated until the desired power factor is obtained, as indicated by the power-factor meter 77. If it is desired to maintain a power factor which results from a lagging current flow in the single-phase circuit, the adjustable leads 62 and 63 should be moved in the direction of the condensive elements, as shown in Fig. 5 and, if it is desired to maintain such power factor in the single-phase circuit as is occasioned by the flow of a leading current, the adjustable leads 62 and 63 should be moved to points adjacent the inductive elements 71 and 74 of the phase-modifying device.

When the power demands in the polyphase circuits vary in value and, at the same time, the power-factors vary in accordance with the load demands, balanced polyphase relations may be maintained in the polyphase circuits and the desired power factor in the single-phase circuit by making the following adjustments: The constants of the reactive elements comprising the phase-modifying device are to be adjusted simultaneously with the voltages impressed upon the secondary windings of the transformer supplying power to the polyphase apparatus 5. These adjustments are to be made until the differential wattmeter relay 25 registers zero, thereby indicating that balanced polyphase conditions obtain in the polyphase circuits. Under this circumstance, the currents obtaining in the several polyphase circuits are equal in value and lag or lead with reference to their respective electromotive forces by the same amount. Then the position of the rotatable arm 64 is to be varied until the power-factor instrument 77 registers the desired value, thereby indicating that the power factor of the single-phase circuit is restored to its predetermined value.

The above explanation of the operation of the system shown in Fig. 4 assumes that the phase-modifying device 65 possesses a one-to-one voltage transformation, that is, the voltages severally impressed upon the device by the windings 68 and 69 are equal in value to the voltage impressed upon the derived phase of the polyphase circuits.

While I have shown and described, in detail, one embodiment of my invention, it will be understood that many modifications may be made by those skilled in the art without departing from the spirit and scope of the appended claims.

I claim as my invention:

1. A phase-modifying device comprising inductive and condensive reactance elements connected to a common point, the condensive elements being severally paired with the inductive elements, a winding connected to the free terminals of each pair of said elements, means for simultaneously impressing voltages of the same value and phase on said windings, and conductors extending from intermediate taps on said windings upon which the phase-modified and derived voltage is impressed.

2. A voltage phase-modifying device comprising two inductive and two condensive reactance elements connected to a common point, the condensive elements being severally paired with the inductive elements, two transformer windings being severally connected to the free terminals of the said two pairs of elements, means for simultaneously in the single-phase circuit, irrespective of the load conditions obtaining in the polyphase circuits.

9. The combination with a single-phase power-supply circuit, an electrical apparatus having polyphase circuits, and means for directly supplying at least one of said polyphase circuits from said single-phase circuit, of phase modifying means for enabling the polyphase apparatus to operate on the single-phase circuit, said phase-modifying means comprising two adjustable inductive and two adjustable condensive reactive elements connected to a common point and the condensive elements being severally paired with the inductive elements, a transformer having its primary winding connected to the single-phase circuit and two secondary windings that are severally connected to the free terminals of said two pairs of elements and simultaneously impressed with equal voltages, taps on said transformer windings, adjustable leads adapted for connection to said taps and comprising one of said polyphase circuits, and means for connecting said adjustable leads to corresponding taps on said secondary transformer windings whereby a predetermined power factor may be constantly maintained in the single-phase circuit, irrespective of the load conditions in the polyphase circuits.

10. The combination with a single-phase power-supply circuit, an electrical apparatus having polyphase circuits, and means for directly supplying at least one of said polyphase circuits from said single-phase circuit, of phase-modifying means connected to at least one of said polyphase circuits to enable the polyphase apparatus to operate on the single-phase circuit, said phase-modifying means comprising two adjustable inductive and two adjustable condensive reactive elements connected to a common point and the condensive elements being severally paired with the inductive elements, a transformer having its primary winding connected to the single-phase circuit and two secondary windings that are severally connected to the free terminals of said two pairs of elements and simultaneously impressed with equal voltages, taps on said transformer windings, adjustable leads adapted for connection to said taps and comprising one of said polyphase circuits, means for connecting said adjustable leads to corresponding taps on said secondary transformer windings whereby a predetermined power factor may be constantly maintained in a single-phase-circuit irrespective of the load conditions in the polyphase circuits, and means for varying the voltage impressed on the said secondary transformer windings in accordance with the polyphase loads obtaining in the polyphase circuits.

11. A phase-modifying device comprising two inductive and two condensive reactance elements connected to a common point, the condensive elements being severally paired with the inductive elements, a transformer having a primary winding and two similar secondary windings that are severally connected to the free terminals of the said two pairs of reactance elements, taps on said secondary windings, adjustable leads across which the phase-modified voltage is impressed, and means for connecting said adjustable leads to corresponding taps on said secondary transformer windings.

In testimony whereof, I have hereunto subscribed my name this 8th day of March, 1917.

CHARLES LE G. FORTESCUE.